US010371871B2

(12) United States Patent
Bolis (10) Patent No.: US 10,371,871 B2
(45) Date of Patent: Aug. 6, 2019

(54) OPTICAL DEVICE FOR STABILIZATION OF IMAGES

(71) Applicant: Webster Capital LLC, Wilmington, DE (US)

(72) Inventor: Sébastien Bolis, Crolles (FR)

(73) Assignee: Webster Capital LLC, Wilmington, DE (US)

( * ) Notice: Subject to any disclaimer, the term of this patent is extended or adjusted under 35 U.S.C. 154(b) by 0 days.

(21) Appl. No.: 15/877,261

(22) Filed: Jan. 22, 2018

(65) Prior Publication Data

US 2018/0143356 A1    May 24, 2018

Related U.S. Application Data

(63) Continuation of application No. 15/106,799, filed as application No. PCT/EP2014/078520 on Dec. 18, 2014, now Pat. No. 9,874,665.

(30) Foreign Application Priority Data

Dec. 20, 2013   (FR) ...................................... 13 63272

(51) Int. Cl.
   *G02B 26/00* (2006.01)
   *G02B 3/14* (2006.01)
   *G02B 27/64* (2006.01)

(52) U.S. Cl.
   CPC ............. *G02B 3/14* (2013.01); *G02B 26/004* (2013.01); *G02B 27/646* (2013.01)

(58) Field of Classification Search
   CPC ....... G02B 3/14; G02B 26/004; G02B 27/646
   (Continued)

(56) References Cited

U.S. PATENT DOCUMENTS

| 7,369,723 B1 | 5/2008 | Mescher |
| 8,649,103 B2 * | 2/2014 | Andreasch ........... B23K 26/046 359/666 |

(Continued)

FOREIGN PATENT DOCUMENTS

EP    2034338    3/2009

OTHER PUBLICATIONS

International Search Report and Written Opinion form PCT/EP2014/078520, dated Jun. 30, 2016 (English Translation and French Version), Wavelens, pp. 1-20.

*Primary Examiner* — Euncha P Cherry
(74) *Attorney, Agent, or Firm* — Robert C. Kowert; Meyertons, Hood, Kivlin, Kowert & Goetzel, P.C.

(57) ABSTRACT

An optical device for the stabilization of images, including a first deformable membrane and a second deformable membranes, a support to which a respective peripheral anchoring area of each of said membranes is connected, and a constant volume of fluid enclosed between the first and the second membrane, said fluid producing mechanical coupling of said first and second membranes. The optical device also includes: a first actuation device of a region of the first membrane located between the peripheral anchoring area and a central part of the first membrane; and a second actuation device of a region of the second membrane located between the peripheral anchoring area and a central part of the second membrane. A control means of the first and second actuation devices is configured, from a rest position where the first and second actuation devices are inactive, to have multiple operating modes to apply respective actuation voltage to the first actuation device or the second actuation device.

20 Claims, 6 Drawing Sheets

(58) Field of Classification Search
USPC .......................................................... 359/291
See application file for complete search history.

(56) References Cited

U.S. PATENT DOCUMENTS

8,755,124 B2  6/2014  Aschwanden et al.
9,874,665 B2  1/2018  Bolis

* cited by examiner

OPTICAL DEVICE FOR STABILIZATION OF IMAGES

This application is a continuation of U.S. patent application Ser. No. 15/106,799, filed Jun. 20, 2016, now U.S. Pat. No. 9,874,665, which is a § 371 national stage entry of International Application No. PCT/EP2014/078520, which claims priority to French Application No. 1363272, all of which are hereby incorporated by reference herein in their entirety.

FIELD OF THE INVENTION

The present invention relates to an optical device designed for stabilization of images and an operating process of such an optical device.

BACKGROUND OF THE INVENTION

In image-capture systems such as cameras embedded in mobile phones, it is necessary to ensure an image-stabilization function, in particular for compensating any hand motion of the user.

For this purpose an optical device is sought, capable of deviating an incident beam in an angular range of the order of ±1° at a frequency of between 5 and 30 Hz.

There are optical devices based on actuatable membranes capable of deviating an incident beam and/or varying the focal length.

Figure 1A:
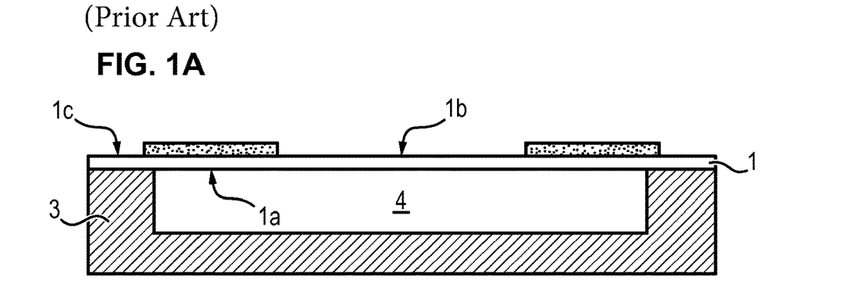
FIG. 1A is a sectional view of a known device comprising a deformable membrane, at rest.

FIG. 1A illustrates an optical device comprising a membrane 1 deformable on contact with a constant volume of fluid 4 and an actuation device 5 of a region 1a of the membrane located between a peripheral area 1c at the level of which the membrane is anchored in or on a support 3, and a central part 1b of said membrane. The main function of the actuation device is to chase some of the volume of fluid 4 of the periphery towards the center of the optical device. The configuration illustrated in FIG. 1A corresponds to the optical device at rest, that is, without electrical voltage being applied to the actuation device.

Figure 1B:
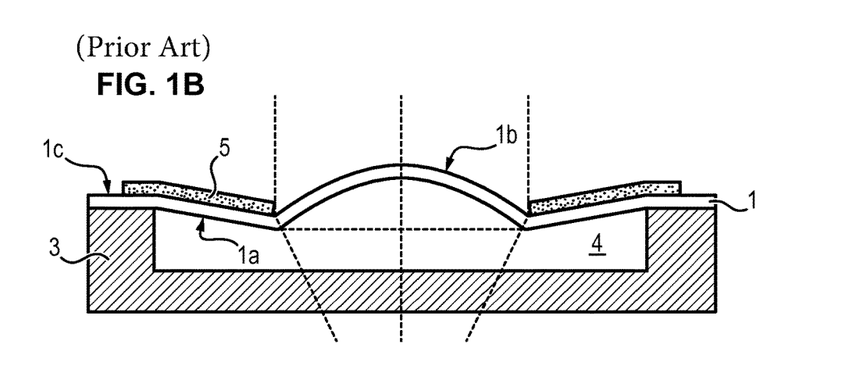
FIG. 1B is a sectional view of the device of FIG. 1A, in operation of variation in focal length type.
Figure 1C:
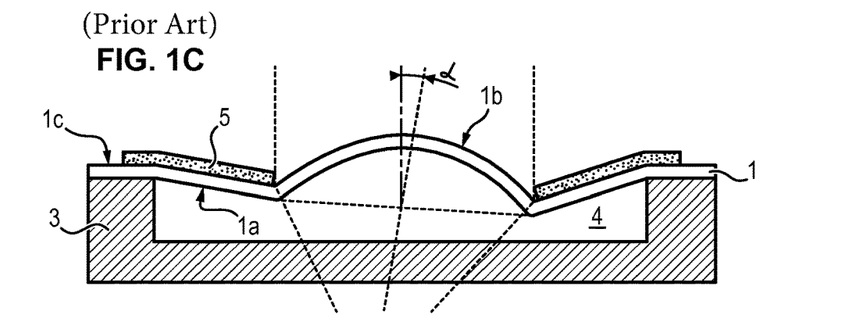
FIG. 1C is a sectional view of the device of FIG. 1A, in operation of variation in focal length and deviation of the incident beam type.

Such a fluid displacement principle varies a focal distance of the optical device by exerting symmetrical actuation about the central region of the membrane, as illustrated in FIG. 1B, or deviates an optical beam by exerting dissymmetrical actuation, as illustrated in FIG. 1C.

In FIG. 1B, the actuation device bends uniformly over the entire peripheral region of the membrane.

Deformation of the central part 1b of the membrane caused by displacement of the fluid induces focal length variation of the device.

In FIG. 1C, the actuation device does not bend uniformly over the entire actuation region 1a of the membrane, but instead presents different deflections according to placement on this actuation region. This configuration can for example be obtained by placing several actuators in the actuation region 1a of the membrane. Deformation of the membrane causes focal length variation and angular deviation (angle α) of the incident beam relative to the position at rest.

Figure 1D:
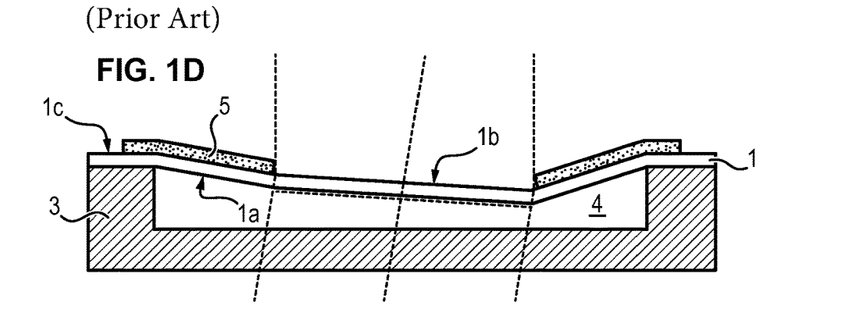
FIG. 1D is a sectional view d'un known device comprising a divergent membrane at rest, in operation of deviation type.

FIG. 1D illustrates a configuration of the optical device in which the position at rest (not shown) is divergent and non-uniform bending of the actuation device produces only deflection of the incident beam, without focal length variation.

The aptitude of the optical device to procure double variation of the focal length and of the angular deviation is sought to ensure the image-stabilization function in the cameras or other on-board optical systems.

There are also optical devices comprising two deformable membranes coupled mechanically by a constant volume of fluid trapped between them. An incident light beam is therefore intended to pass through the first membrane, the fluid then the second membrane, each membrane forming a diopter.

Document JP 11-1332110 describes such an optical device which comprises an actuation device for one only of both membranes, the other membrane able to deform freely as a function of the fluid pressure applied.

In this device, the activated membrane has a rigid central part, substantially non-deformable, and a deformable actuation region. As the actuators of the actuation device are capable of bending in two opposite directions, this device ensures the two functions of deviation and variation in focal length. To ensure the deviation function, the activated membrane must pivot without driving fluid to the second membrane which is suppler to avoid any focal length variation. For this purpose, the actuators are activated such that the central part of the membrane rises at one side and lowers at the other with the same range to ensure that the volume is preserved at its level. When preservation of the volume is no longer ensured at the level of the activated membrane, the fluid driven towards the non-activated membrane causes deformation of said membrane and consequently variation in focal length of the optical device.

In the event where the membranes can be assimilated into two plane diopters, the optical device can be assimilated into a prism.

Prismatic deviation, specifically the angle D between the beam entering the prism and the beam leaving the prism is given by the formula: $D=(n-1) \times A$, where n is the optical index of the prism and A is the angle between the two faces of the prisms via which the beam enters and leaves.

To maximize deviation for a given optical index, the angle A between the two faces of the prism (therefore between the two membranes) thus has to be maximized.

The aim therefore is to design an optical device capable of increasing possible deviation relative to that of existing optical devices.

BRIEF DESCRIPTION OF THE INVENTION

An aim of the invention is therefore to design an optical device for stabilization of images, independently of each other fulfilling a deviation function of a light beam and a variation function in focal length, producing an extended range of deviation and/or variation in focal length, enabling actuation which minimizes the electrical actuation voltage, and which is compact and simple to make.

In accordance with the invention, an optical device for stabilization of images is proposed, comprising:
  a first deformable membrane,
  a second deformable membrane,
  a support to which a respective peripheral anchoring area of each of said membranes is connected,
  a constant volume of fluid enclosed between the first and the second membrane, said fluid producing mechanical coupling of said first and second membranes,
  at least one first actuation device of a region of the first membrane located between the peripheral anchoring area and a central part of the first membrane comprising at least one actuator configured to bend by application of electrical actuation voltage so as to displace some of the volume of fluid,
  at least one second actuation device of a region of the second membrane located between the peripheral anchoring area and a central part of the second membrane comprising at least one actuator configured to bend by application of electrical actuation voltage so as to displace some of the volume of fluid, control means of the first and second actuation devices, configured, from a rest position in which the first and second actuation devices are inactive:

in a first operating mode, to apply respective electrical actuation voltage to at least one actuator of the first actuation device and, where appropriate, to at least one actuator of the second actuation device so as to compensate displacement of some of the volume of fluid by the first membrane by displacement of a corresponding proportion of the volume of fluid by the first and/or the second membrane, the central part of the first membrane moving without deforming, in a second operating mode, to apply to at least one actuator of the first and/or of the second actuation device respective electrical actuation voltage so as to displace some of the volume of fluid towards the center or towards the periphery of the device, the central part of the first membrane deforming under the effect of the fluid pressure caused by said displacement.

Particularly advantageously, the first membrane has sufficiently low stiffness so that in the absence of fluid pressure activation of the first actuation device sets the central part of the first membrane in motion without deforming it.

According to an embodiment, each actuator of the first actuation device is configured to bend in a single direction.

Advantageously, said at least one actuator of the first actuation device comprises a piezoelectric crown.

According to an embodiment, the second actuation device comprises at least one actuator configured to bend in a first direction and a second actuator configured to bend in a second direction opposite the first direction.

The second actuation device advantageously comprises actuators in the form of beams.

According to a preferred embodiment, the diameter of the central part of the second membrane is less than the diameter of the central part of the first membrane and/or the width of the actuation region of the second membrane is greater than the width of the actuation region of the first membrane.

According to an embodiment, the actuation device of the first membrane comprises at least one first actuator configured to bend in a first direction and a second actuator configured to bend in a second direction opposite the first direction.

Another object of the invention relates to an imaging device comprising at least one optical device such as described hereinabove.

Another object relates to a method for variation in focal length and/or deviation of an optical device comprising:

a first deformable membrane, a second deformable membrane, a support to which a respective peripheral anchoring area of each of said membranes is connected, a constant volume of fluid enclosed between the first and the second membrane, said fluid producing mechanical coupling of said first and second membranes, a first actuation device of a region of the first membrane located between the peripheral anchoring area and a central part of said membrane, comprising at least one actuator configured to bend by application of electrical actuation voltage so as to displace some of the volume of fluid, said displacement of the fluid being likely to cause deformation of the central part of the first membrane, a second actuation device of a region of the second membrane located between the peripheral anchoring area and a central part of said membrane (2), comprising at least one actuator configured to bend by application of electrical actuation voltage so as to displace some of the volume of fluid (4), said displacement of the fluid being likely to cause deformation of the central part (2b) of the second membrane, said method comprising:

a first operating mode in which respective electrical actuation voltage is applied to at least one actuator of the first actuation device and, where appropriate, to at least one actuator of the second actuation device so as to compensate displacement of some of the volume of fluid induced by the displacement of the first membrane by displacement of a corresponding proportion of the volume of fluid by the first and/or the second membrane, the central part of the first membrane moving without deforming, a second operating mode in which respective electrical actuation voltage is applied to at least one actuator of the first and/or of the second actuation device so as to cause displacement of some of the volume of fluid towards the center or towards the periphery of the device, said displacement of fluid causing deformation of the central part of the first and/or of the second membrane.

According to an embodiment, each actuator of the actuation device of the first membrane is configured to bend in a single direction and, in the first operating mode, is activated at least one actuator of the first actuation device and at least one actuator of the second actuation device in said direction. In the second operating mode the second actuation device is not activated or the second actuation device is activated in the direction opposite the direction of bending of the first actuation device.

According to an embodiment, the actuation device of the first membrane comprises at least one first actuator configured to bend in a first direction and a second actuator configured to bend in a second direction opposite the first direction and, in the first operating mode, said actuators are activated in the two opposite directions so as to compensate the volume of fluid displaced at the level of the first membrane, the second actuation device not being activated.

According to an embodiment, the first and the second actuation device each comprise at least one first actuator configured to bend in a first direction and a second actuator configured to bend in a second direction opposite the first direction and, in the first operating mode, said actuators are activated in the two opposite directions so as to compensate the volume of fluid displaced by the first membrane by a volume of fluid displaced by the second membrane.

BRIEF DESCRIPTION OF DRAWINGS

Other characteristics and advantages of the invention will emerge from the following detailed description in reference to the appended drawings, in which.

For legibility reasons of the figures, the different elements illustrated are not necessarily illustrated on the same scale.

The reference numerals are used from one figure to the other to designate the same elements.

DETAILED DESCRIPTION OF THE INVENTION

FIGS. 3A to 4B illustrate different implementations of a first mode of actuation of an optical device 100, according to different embodiments of the actuation devices of both membranes.

The optical device 100 has an optical axis X.

The device 100 comprises two deformable membranes 1, 2, whereof the periphery is sealingly anchored on a support 3.

In this example, the support 3 is in the form of an annular crown whereof the center is intended to receive a volume of fluid 4 contained in a sealed cavity delimited by both membranes 1, 2 and the support 3.

The fluid 4 can be liquid or gas.

The membranes 1 and 2 are anchored on either side of the support 3.

Advantageously, the membranes extend substantially parallel to each other.

Each membrane comprises a respective anchoring area 1c, 2c.

Each membrane also comprises a respective central part 1b, 2b which corresponds to an optical field of the optical device.

Each membrane therefore comprises a face, called internal face, which is in contact with the fluid 4, and an opposite face, called outer face, which is in contact with a second fluid, not referenced, which can be ambient air.

Membrane means any supple and tight film, such that the membrane forms a barrier between the fluid 4 and the fluid located on the opposite face of the membrane.

In the event where the optical device 100 is a lens, which therefore functions in transmission, both membranes 1, 2 are transparent, at least in their central part 1b, 2b, to an optical beam (not shown) intended to propagate through the lens by successively passing through the central part of a first lens, the fluid and the central part of the second lens.

In the event where the optical device 100 is a mirror, the central part of one of the two membranes is reflecting.

Each membrane 1, 2 is capable of deforming reversibly, from a rest position (which can be planar or not), under the action of a fluid displacement 4 which varies the thickness of fluid at the level of the central part of each membrane.

The more supple a membrane (in other terms, the lower its stiffness), the greater the deformation caused by a fluid displacement.

The fluid 4 is enclosed between both membranes 1, 2 and produces mechanical coupling of said membranes such that the effect of a fluid displacement cannot be evaluated independently for each of the membranes but combined according to the respective properties of each of the membranes.

The fluid 4 is sufficiently incompressible to move towards the central part of the device when force is applied to a membrane in the direction of the fluid, this force being applied in an intermediate part between the anchoring area and the central part of the membrane.

The shape of the support 3 and membranes 1 and 2 can advantageously be a shape of revolution about the optical axis X, but those skilled in the art could select any other shape without as such departing from the scope of the present invention.

In the device, each of the two membranes 1 and 2 is provided with a respective actuation device 5, 5'.

Those skilled in the art know different actuation devices utilizable to actuate membranes.

These devices are based on different technologies, examples of which are piezoelectric actuation, electrostatic, electromagnetic, thermal actuation or even based on electroactive polymers.

In this respect reference could be made to such actuation devices in documents FR2919073, FR2950154 and FR2950153.

The choice of actuation technology and dimensioning of the actuation device depends on expected performance levels (for example, the capacity to bend in a single direction or in two opposite directions), stresses to which it will be subjected during operation of the device, and considerations relative to the electrical actuation voltage to be applied.

For example, an actuation device particularly adapted to creating a single direction of actuation is based on piezoelectric technology.

It is recalled that a piezoelectric actuator comprises a block of piezoelectric material sandwiched totally or partially between two electrodes, when fed, intended to apply an electrical field to the piezoelectric material. This electrical field is used to control mechanical deformation of the block of piezoelectric material. The block of piezoelectric material can be monolayer or multilayer and extend beyond one electrode.

The actuation device can comprise a single actuator in the form of a crown or else several separate actuators (for example in the form of beams) distributed uniformly over the circumference of the membrane. This second embodiment deforms the membrane non-symmetrically.

Optionally, the actuators can be capable of bending in two opposite directions, which accesses optical performances superior to those of devices having only one direction of bending; however, actuation of these dual-direction devices is more complex.

Such actuation in two opposite directions can be obtained in two different ways. A first solution consists of ensuring that each actuator of the actuation device is capable of bending in one direction then in the other as a function of the electrical voltage applied to it. This requires the use of specific materials such as AlN which functions in both directions of deflection but which is less effective in terms of deflection. A second solution consists of using in the actuation region actuators which bend only in one direction and other actuators which bend only in the other direction. This second solution has the advantage of enabling use of effective materials in terms of deflection; however, its execution can complicate manufacturing and increase the cost of the actuation device.

The actuation device 5, 5' of each membrane is arranged in a respective region 1a, 2a, called actuation region, located between the respective peripheral anchoring area 1c, 2c and the respective central part 1b, 2b of each membrane. Optionally, the actuation device can extend in part over the peripheral anchoring area.

In the figures described hereinbelow, the actuation device is shown on the outer face of each membrane. However, the invention is not limited to this embodiment but also allows the actuation device to be arranged on the internal face of each membrane, or even inside each membrane.

The optical device comprises control means (not illustrated) which activate the actuation device of the first membrane and the actuation device of the second membrane as a function of each other, so as to, according to the preferred embodiment, either compensate a volume of fluid displaced by a membrane by a volume of fluid displaced by said membrane or the other membrane so as not to modify the fluid pressure exerted on this membrane, or on the contrary to impose displacement of fluid likely to cause a variation in fluid pressure exerted on a membrane.

Said control means can advantageously comprise a specific integrated circuit which, from input data originating from the imager or motion sensors of gyroscope type, delivers appropriate voltage to the electrode(s) of the actuation devices.

In the embodiments illustrated in FIGS. 3A to 9B, it is supposed that at rest, that is when the actuation device 5 of the first membrane is not activated, the first and the second membrane are planar (configuration not illustrated). However, each of the two membranes could be designed such that at rest it has a concave or convex form without as such departing from the scope of the present invention.

In a first operating mode, intended to vary deviation without modifying the focal length of the device, at least one actuator of the first membrane is activated and, where appropriate, of the second membrane so as to retain a zero difference in pressure at the level of each membrane (difference in pressure means the difference between the pressure exerted by the fluid 4 in contact with the internal face of each membrane and the pressure exerted by the fluid in contact with the outer face of said membrane).

This preservation of zero difference in pressure is obtained by ensuring that a volume of fluid displaced in a direction by a membrane corresponds to a volume of fluid displaced in the same direction by the other membrane and/or to a volume displaced in the opposite direction by the same membrane.

Therefore, movements of fluid caused by movements of actuators of each of the membranes are compensated overall between the two membranes and/or at the level of each membrane.

The result of the compensation conducted out in this first operating mode that the central part 1b, 2b of each membrane is likely to pivot or translate relative to its rest position, but not undergo deformation.

Therefore, the optical device can deviate an incident beam but its focal length does not vary.

FIGS. 3A to 3E illustrate different actuation configurations corresponding to said first operating mode of the device.

Figure 3A:
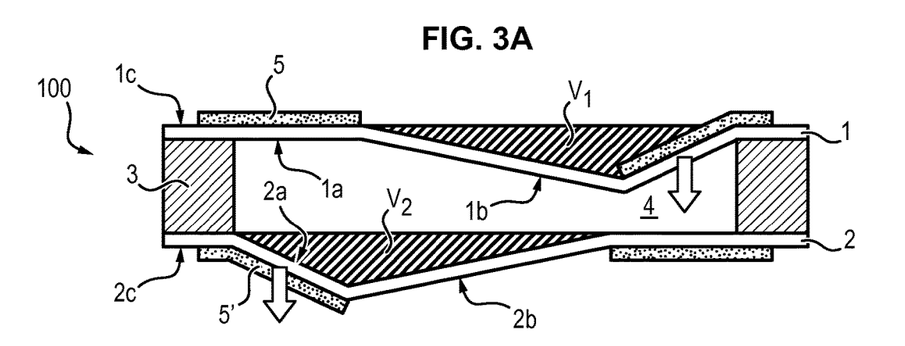
FIGS. 3A to 3C are sectional views of an optical device according to an embodiment of the invention in which the actuators of each membrane are designed to bend in the same and only direction, said device being shown in a first operating mode in which at least one actuator of each membrane is activated so as to compensate the volume of fluid displaced by the first membrane by a volume of fluid displaced by the second membrane.

In FIG. 3A, the actuation device 5 of the first membrane 1 is controlled such that an actuator located in a first part of the actuation region 1a does not bend, while an actuator located in a second part of the actuation region diametrically opposed to the first bends towards the fluid 4. The central part 1b of the first membrane pivots relative to the rest position, and stays planar as in the rest position. The volume displaced by the first membrane is shown by the hatched area V1.

The actuation device 5' of the second membrane is controlled simultaneously such that an actuator located in a first part of the actuation region 2a located opposite the second part of the actuation region 1a does not bend, while an actuator located in a second part of the actuation region 2a diametrically opposed to the first bends in the direction opposite the fluid 4. The central part 2b of the second membrane pivots relative to the rest position and remains planar as in the rest position. The volume displaced by the second membrane is shown by the hatched area V2.

The volumes V1 and V2 are identical.

Figure 3B:
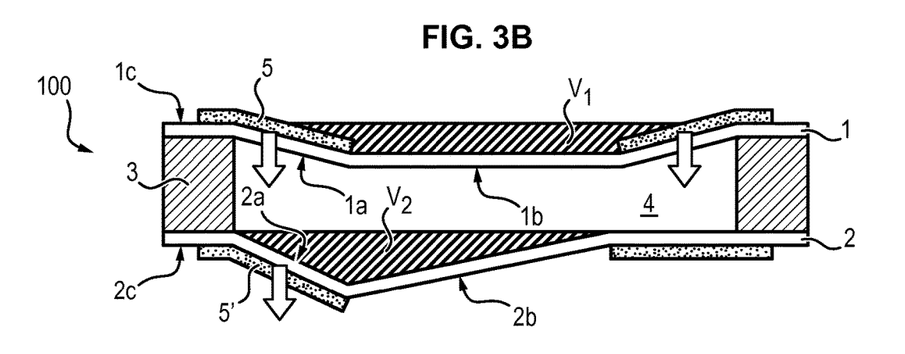

In FIG. 3B, the actuation device 5 of the first membrane 1 is controlled symmetrically such that all the actuators bend of the same range towards the fluid 4. The central part 1b of the first membrane translates relative to the rest position and remains planar as in this rest position. The volume displaced by the first membrane is shown by the hatched area V1.

The actuation device 5' of the second membrane is controlled jointly such that an actuator located in a first part of the actuation region 2a does not bend, while an actuator located in a second part of the actuation region 2a diametrically opposed to the first bends in a direction opposite the fluid 4. The central part 2b of the second membrane pivots relative to the rest position, and stays planar as in the rest position. The volume displaced by the second membrane is shown by the hatched area V2.

The volumes V1 and V2 are identical.

Figure 3C:
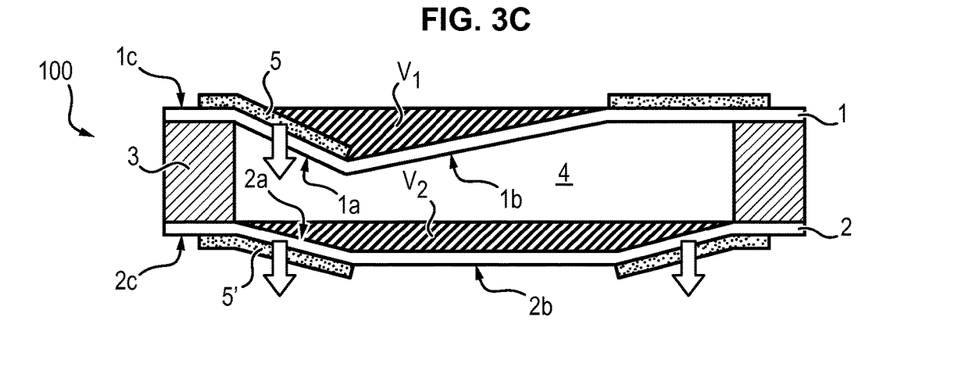

In FIG. 3C, the actuation device 5 of the first membrane 1 is activated such that an actuator located in a first part of the actuation region 1a does not bend, while an actuator in a second part of the actuation region 1a diametrically opposed to the first bends towards the fluid 4. The central part 1b of the first membrane pivots relative to the rest position, and stays planar as in the rest position. The volume displaced by the first membrane is shown by the hatched area V1.

The actuation device 5' of the second membrane 2 is controlled conjointly symmetrically such that all the actuators bend of the same range in the direction opposed to that of the fluid 4. The central part 2b of the second membrane translates relative to the rest position, and stays planar as in this rest position. The volume displaced by the second membrane is shown by the hatched area V2.

The volumes V1 and V2 are identical.

The situations illustrated in FIGS. 3A to 3C correspond to embodiments of the optical device in which the actuators of each of the actuation devices bend in a single direction when electrical actuation voltage is applied to them. In these cases, the volume of fluid displaced by one membrane is compensated by the volume displaced by the other membrane.

Other situations are also possible—still for the first operating mode—if the actuators of each actuation device are designed such that they bend in two opposite directions as a function of the electrical actuation voltage which is applied to them. In these cases, examples of which are illustrated in FIGS. 3D and 3E, the volume of fluid displaced by a membrane can be compensated by this same membrane and/or by the other membrane.

Figure 3D:
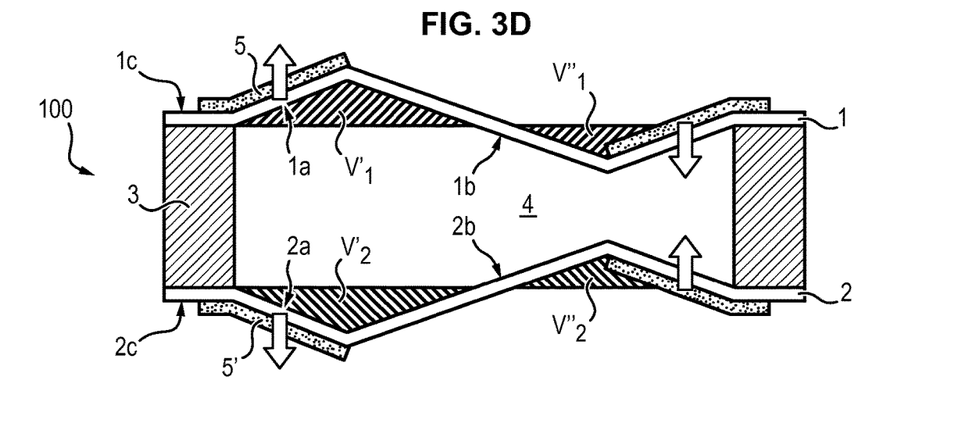
FIG. 3D is a sectional view of an optical device according to an embodiment of the invention in which the actuators of each membrane are adapted to bend in two opposite directions, in said first operating mode, the compensation of the volume of fluid displaced being carried out at the level of each membrane.

In FIG. 3D, the actuation device 5 of the first membrane is activated such that in a first part of the actuation region 1a (shown here to the left of figure) the actuators bend in a direction opposed to that of the fluid 4, whereas in a second part of the actuation region 1a diametrically opposed to the first (shown here to the left of figure), the actuators bend in the direction of the fluid 4. The central part 1b of the first membrane pivots relative to the rest position, and stays planar as in the rest position. The volume displaced by the first membrane is shown by the hatched areas V1' and V1". To the extent where the range of bending of the actuators is equal in both directions, the volumes V1' and V1" are equal: the conservation of the volume is therefore done at the level of the first membrane itself.

The actuation device 5' of the second membrane 2 is activated simultaneously such that an actuator located in a first part of the actuation region 2a opposite the first part of the actuation region 1a bends in a direction opposite the fluid 4, while an actuator located in a second part of the region 2a diametrically opposed to the first bends towards the fluid 4. The central part 2b of the second membrane translates relative to the rest position, and stays planar as in this rest position. The volume displaced by the second membrane is shown by the hatched areas V2' and V2". To the extent where the range of bending of the actuators is equal in both directions, the volumes V2' and V2" are equal: the conservation of the volume is therefore done at the level of the second membrane itself.

Figure 3E:
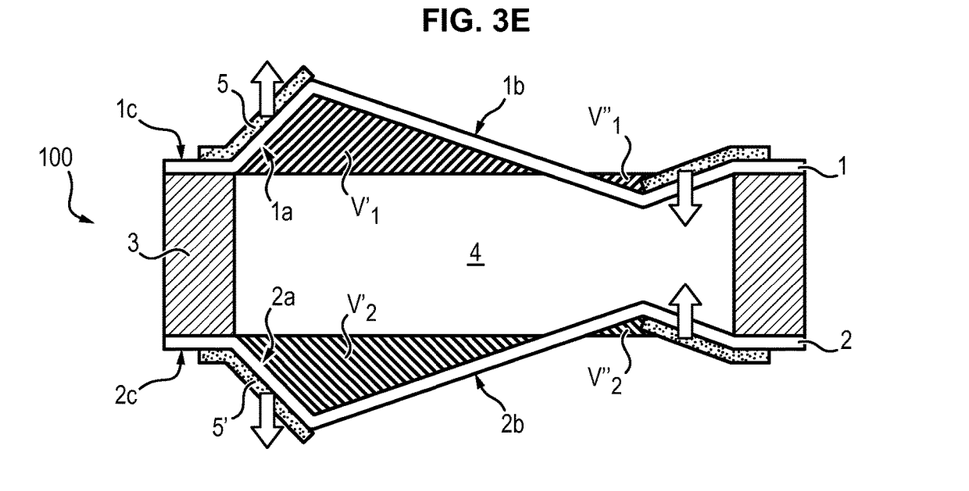
FIG. 3E is a sectional view of an optical device according to an embodiment of the invention in which the actuators of each membrane are adapted to bend in two opposite directions, in said first embodiment, the compensation of the volume of fluid displaced being carried out overall between the two membranes.

In FIG. 3E, the actuation device 5 of the first membrane is activated such that an actuator located in a first part of the actuation region 1a (shown here to the left of figure) bends in a direction opposite the fluid 4, while an actuator located in a second part of the actuation region 1a diametrically opposed to the first (shown here to the right of figure) bends towards the fluid 4, the range of the bending towards the fluid being less than that of the bending in the direction opposite to the fluid. The central part 1b of the first membrane pivots relative to the rest position, and stays planar as in the rest position. The volume displaced by the first membrane is shown by the hatched areas V1' and V1", which are not equal because of the difference in range of the bending of the actuators in both directions.

The actuation device 5' of the second membrane 2 is controlled simultaneously such that an actuator located in a first part of the actuation region 2a opposite the first part of the actuation region 1a bends in a direction opposite the fluid 4, while an actuator located in a second part of the region 2a diametrically opposed to the first bends towards the fluid 4, the range of the bending towards the fluid being less than that of the bending in the direction opposite the fluid. The central part 2b of the second membrane translates relative to the rest position, and stays planar as in this rest position. The volume displaced by the second membrane is shown by the hatched areas V2' and V2", which are not equal because of the difference in range of the bending of the actuators in both directions.

The total of the volumes V1' and V2' is equal to the total of the volumes V1" and V2", the conservation of the volume of fluid displaced in this case being carried out between the two membranes.

Other configurations, which also are part of the present invention, are also accessible by conserving the volume of fluid displaced and without changing the difference in pressure in the central part of each membrane.

Figure 4A:
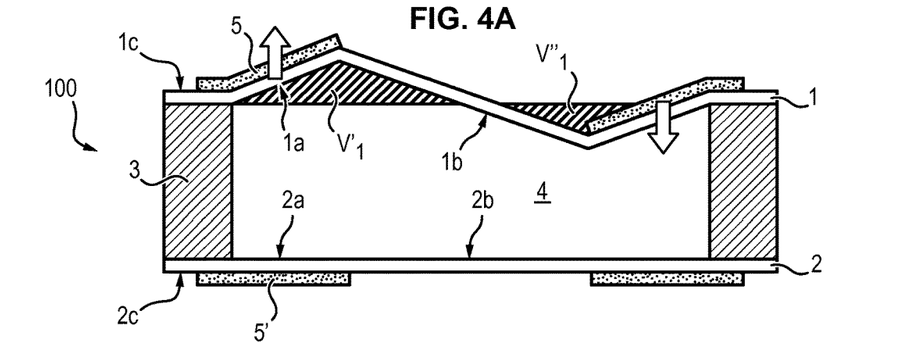
FIG. 4A is a sectional view of an optical device according to an embodiment of the invention in which the actuators of the first membrane are adapted to bend in two opposite directions, in said first operating mode; the actuators of the second membrane not being activated, compensation of the volume of fluid displaced is realized at the level of the first membrane.

In FIG. 4A, only the actuation device 5 of the first membrane is activated; the actuation device 5' of the second membrane is at rest, no electrical voltage being applied to it.

The actuation device 5 of the first membrane is activated such that an actuator located in a first part of the actuation region 1a (shown here to the left of figure) bends in a direction opposite the fluid 4, while an actuator located in a second part of the actuation region 1a diametrically opposed to the first (shown here to the right of figure) bends towards the fluid 4, the range of bending being the same in both directions. The central part 1b of the first membrane pivots relative to the rest position, and stays planar as in the rest position. The volume displaced by the first membrane is shown by the hatched areas V1' and V1", which are equal: preservation of the volume is therefore done at the level of the first membrane itself. The second membrane as such remains in its rest position without deforming.

Figure 4B:
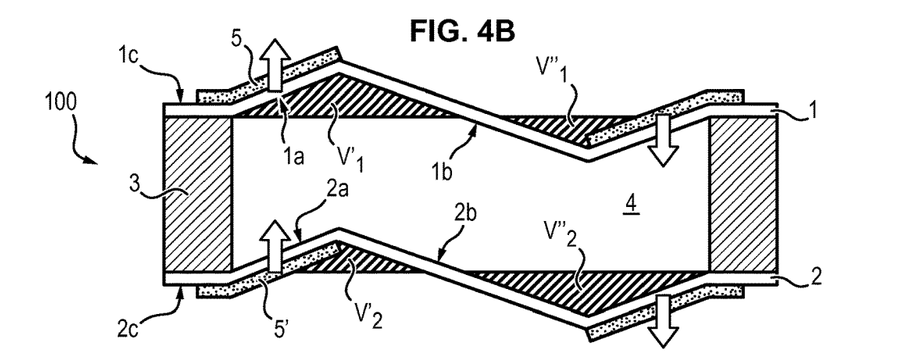
FIG. 4B is a sectional view of an optical device according to an embodiment of the invention in which the actuators of the first membrane are adapted to bend in two opposite directions, in said first operating mode, the optical device producing in this case neither deviation of an incident beam nor variation in focal length.

In FIG. 4B, the actuation device 5 of the first membrane is activated such that an actuator located in a first part of the actuation region 1a (shown here to the left of figure) bends in a direction opposite the fluid 4, while an actuator located in a second part of the actuation region 1a diametrically opposed to the first (shown here to the right of figure) bends towards the fluid 4, the range of bending being the same in both directions. The central part 1b of the first membrane pivots relative to the rest position, and stays planar as in the rest position. The volume displaced by the first membrane is shown by the hatched areas V1' and V1".

The actuation device 5' of the second membrane is activated such that an actuator located in a first part of the actuation region 2a opposite the first part of the actuation region 1a bends towards the fluid 4, while an actuator located in a second part of the actuation region 1a diametrically opposed to the first bends in the direction opposite the fluid 4. The central part 2b of the second membrane pivots relative to the rest position, parallel to the central part 1b of the first membrane, and stays planar as in the rest position. The volume displaced by the second membrane is shown by the hatched areas V2' and V2".

The total of the volumes V1' and V2" is equal to the total of the volumes V1" and V2', the conservation of the volume of fluid displaced in this case being realized between both membranes.

The device of FIG. 4B exhibits neither deviation nor variation in focal length relative to the rest position.

Irrespective of the configuration selected for executing the first operating mode, by alternating over time with an appropriate frequency (typically of the order of 10 to 30 Hz) the side of the activated membrane or the membranes, the incident beam can be deviated to compensate any hand movement.

The optical device 100 is also designed so that in a second operating mode the central part of at least the first membrane deforms under the effect of fluid pressure caused by bending of the actuators so as to modify the focal length of said device.

Figure 5:
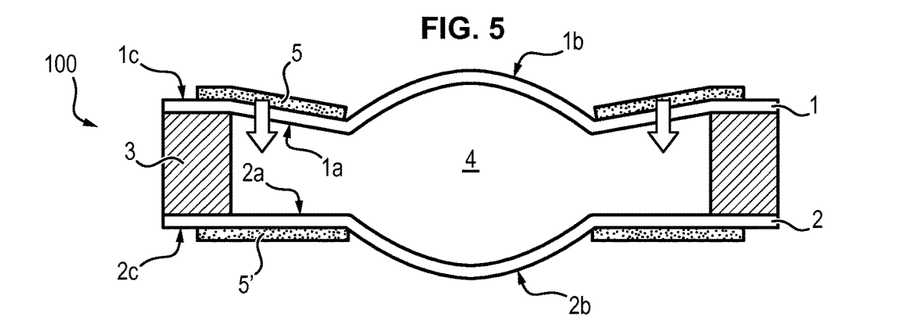
FIG. 5 is a sectional view of an optical device similar to that of FIGS. 3A-3C in which the actuators of each membrane are designed to bend in the same and only direction, said device being shown in a second operating mode in which at least one actuator of the first membrane is activated so as to displace a volume of fluid towards the center of the optical device.
Figure 6:
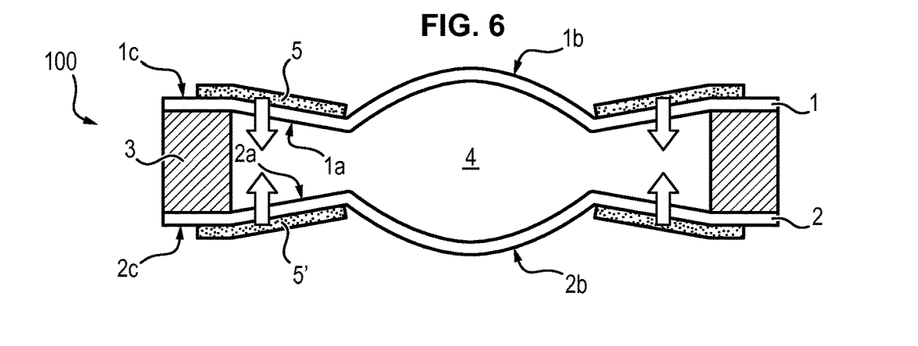
FIG. 6 is a sectional view of an optical device similar to that of FIGS. 3D-3D in which the actuators of each membrane are adapted to bend in two opposite directions, in said second operating mode.

FIGS. 5 and 6 illustrate different implementations of this second operating mode.

FIG. 5 illustrates an optical device 100 in which the actuators of the same membrane all bend in the same and only direction (as the device in FIGS. 3A to 3C).

In this second operating mode, only the actuation device 5 of the first membrane is activated, with no electrical voltage being applied to the actuation device 5' of the second membrane.

The electrical actuation voltage of the device 5 can be equal to or different from the electrical voltage applied to said device in the first operating mode.

The bending of the actuators of the device 5 towards the fluid causes displacement of fluid towards the center of the device.

With the second membrane not being activated, conservation of the volume of fluid involves deformation of the central part 1b, 2b of each of the two membranes, this deformation being more or less pronounced according to the respective stiffness of both membranes.

FIG. 6 illustrates an optical device 100 in which the actuators of the same membrane can flex in both directions (as the device in FIGS. 3D-4B).

In this second operating mode, the actuation devices 5, 5' of the membranes are activated in opposite directions, such that all the actuators flex towards the fluid, causing displacement of the fluid towards the center of the device.

Conservation of the volume of fluid involves deformation of the central part 1b, 2b of each of the two membranes.

Although this is not shown in the appended figures, it is also possible in the second operating mode to activate the actuation device of the first membrane and, where appropriate, of the second membrane so as to induce displacement of fluid to the periphery of the optical device. Therefore, instead of obtaining a convergent optical device as in FIGS. 5 and 6, a divergent optical device can result.

There is also a third operating mode which combines variation in focal length and deviation of the incident beam.

Figure 7A:
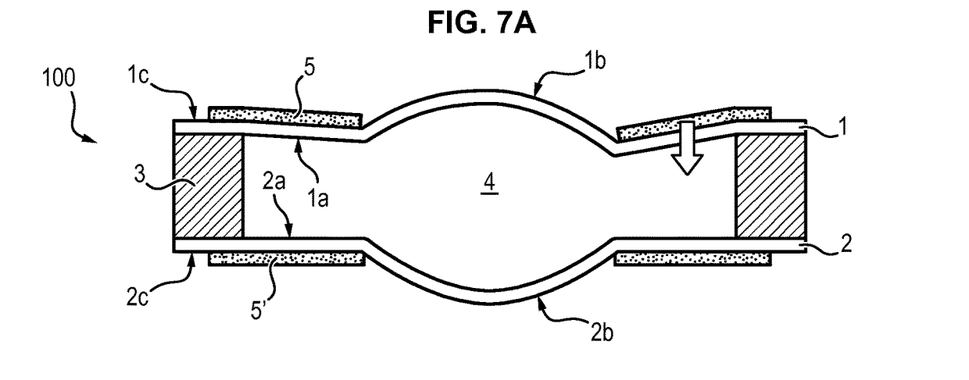
FIGS. 7A-7B are sectional view of an optical device similar to that of FIGS. 3A-3C and 5 in which the actuators of each membrane are designed to bend in the same and only direction, said device being shown in two variants of a third operating mode combining deviation of an incident beam and variation in focal length of the device.
Figure 7B:
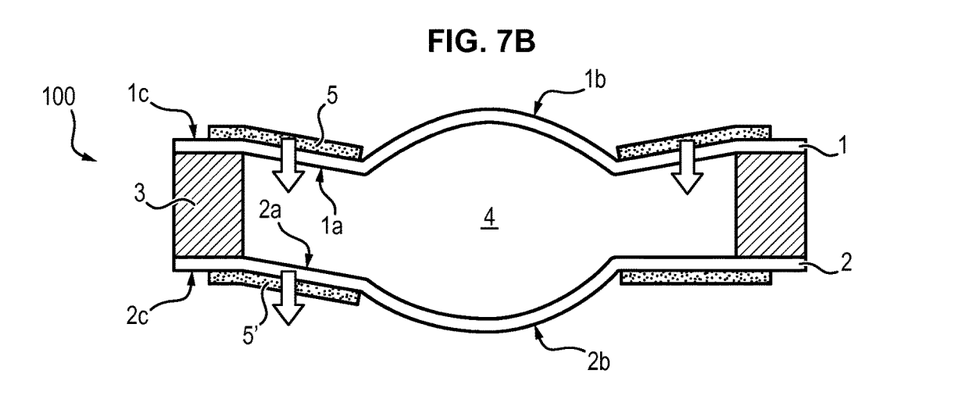

For this purpose, from a device 100 whereof the actuators of the same membrane all bend in the same and only direction (as the device of FIGS. 3A to 3C), the actuators can be activated as illustrated in FIGS. 7A and 7B.

In the case of FIG. 7A, the actuation device 5' of the second membrane is not activated whereas the actuation device 5 of the first membrane is activated non-symmetrically. For example, an actuator located in a part of the actuation area (left part of FIG. 7A) does not bend, while an actuator located in the area diametrically opposite (right part of FIG. 7A) bends towards the fluid.

In this case, the central part of the two membranes deforms, the diopter formed by the first membrane further having an optical axis inclined relative to that of the rest position of the device.

FIG. 7B illustrates a variant implementation of the third operating mode, in which the actuation devices of both membranes are activated. For example, the actuators of the first membrane bend towards the fluid by the same range, whereas the actuation device 5' is activated non-symmetrically, an actuator located in a part of the actuation area of the second membrane (right part of FIG. 7B) does not bend, while an actuator located in the diametrically opposite area (left part of FIG. 7B) bends in the direction opposite the fluid 4. To the extent where the volume of fluid displaced by the first membrane is greater than the volume displaced by the second membrane, conservation of the volume of fluid induces deformation of the central part of each membrane, the diopter formed by the second membrane also having an optical axis inclined relative to that of the rest position of the device.

Figure 8:
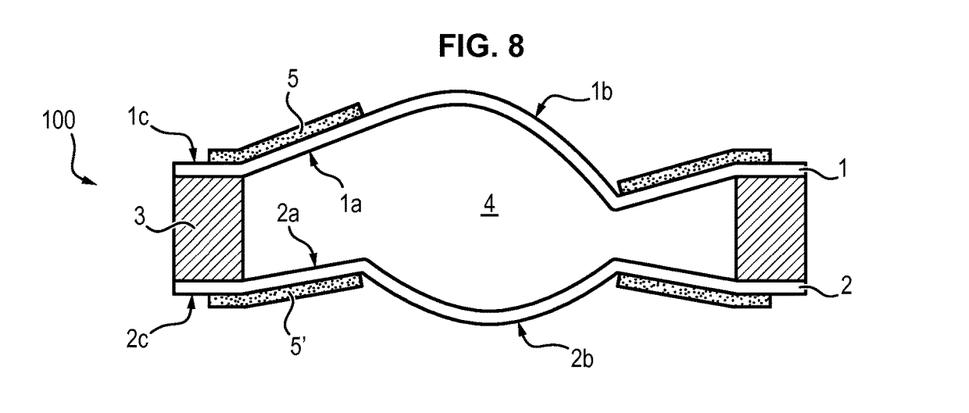
FIG. 8 is a sectional view of an optical device similar to that of FIGS. 3D-4B and 6 in which the actuators of each membrane are adapted to bend in two opposite directions, in said third operating mode.

From a device 100 whereof the actuators of the same membrane bend in both directions (as the device of FIGS. 3D to 4B), the actuators can be activated as illustrated in FIG. 8.

The actuation device 5 of the first membrane is activated such that an actuator located in one part of the actuation area bends in the direction opposite the fluid 5 (left part of FIG. 8) while an actuator located in the part diametrically opposite the actuation area bends towards the fluid 4. The actuation device 5' of the second membrane is activated such that all the actuators bend towards the fluid.

In this case, the central part of both membranes deforms, the diopter formed by the first membrane also having an optical axis inclined relative to that of the rest position of the device.

It is possible to assign to each membrane of the device a specific function and for this purpose design an actuation device optimized for each of the membranes.

Therefore, for example the first membrane can be assigned the variation function in focal length and the second membrane the deviation function.

In this case, for the first actuation device a piezoelectric crown will be advantageously selected and for the second actuation device a plurality of beams of type MEMS (acronym of the term Micro Electro-Mechanical System), actuation of which can also be piezoelectric.

Also, although the figures described previously show membranes 1 and 2 of the same diameter, it can be advantageous to select membranes of different dimensions to maximize possible deviation.

In fact, the fact of decreasing the diameter of the central part 2b of the second membrane and/or increasing the width of the actuation area 2a of said membrane increases bending of the actuators and therefore increases deviation.

It is specified that "diameter" means the diameter of the deformable part of a membrane comprising the central part and the actuation region, but excluding the peripheral anchoring area which is fixed.

This approach is particularly interesting as no fluid pressure is applied to the actuators of the second membrane in the first embodiment (deviation). This allows use of actuators in the form of beams, which are particularly flexible and effective in terms of bending, but which are sensitive to pressure.

Figure 9A:
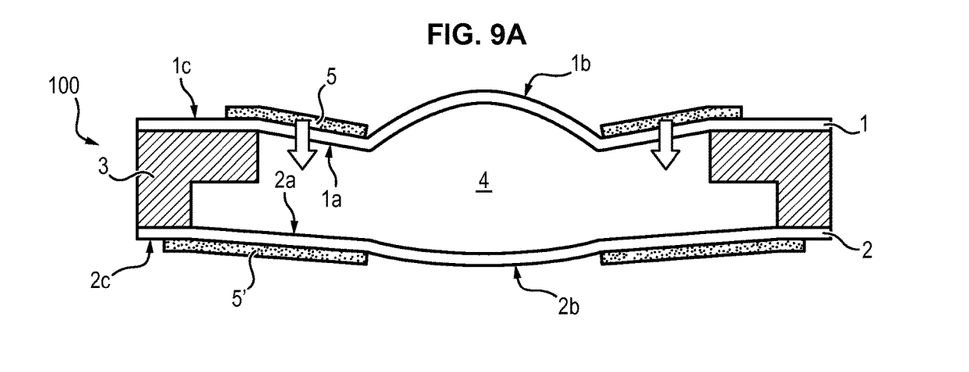
FIGS. 9A and 9B illustrate an optical device in which the diameter of the central part of both membranes is substantially identical but where the width of the actuation area of the second membrane is greater than that of the actuation area of the first membrane, respectively in the second and in the first operating mode.
Figure 9B:
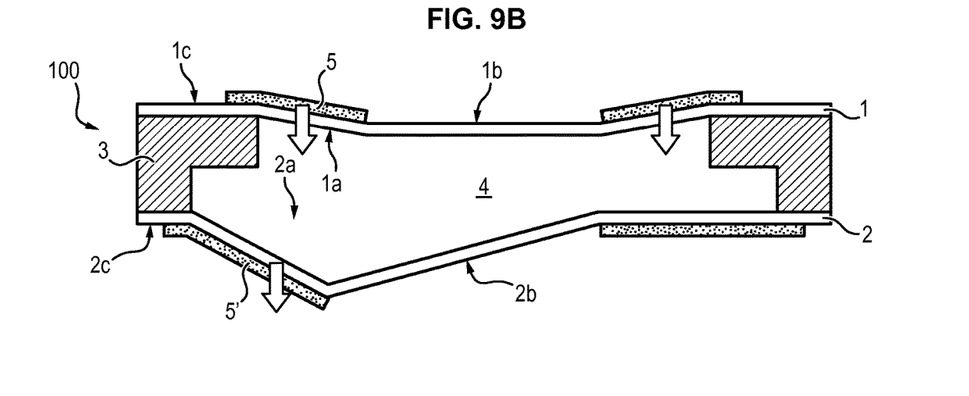

FIGS. 9A-9B illustrate in section an optical device 100 in which the diameter of the central part 1b, 2b of both membranes is substantially identical, but where the width of the actuation area 2a of the second membrane is greater than that of the actuation area 1a of the first membrane. For membranes whereof the total diameter is identical, this can be achieved by conforming the support 3 such that the anchoring area 1c of the first membrane is wider than the anchoring area 2c of the second membrane. At rest, the two membranes are supposedly planar, this configuration however not being limitative.

FIG. 9A corresponds to the second operating mode (focal length variation). The actuator crown of the first membrane bends uniformly towards the fluid 4. The actuators of the second membrane bend by the same range in the direction opposite the fluid 4. Relative bending of the two actuation devices is such that movement of fluid is induced towards the center. This displacement causes deformation of the central part 1b of the first membrane and, to a lesser extent, of the central part 2b of the second membrane, resulting in a convergent device.

FIG. 9B corresponds to the first embodiment (deviation). The actuator crown of the first membrane bends uniformly towards the fluid 4. The actuators of the second membrane bend non-symmetrically in the direction opposite the fluid 4, an actuator located in a part of the actuation area 2a not being activated while an actuator located in a part diametrically opposite the actuation area bends in the direction opposite the fluid 4 with sufficient range so that the volume of fluid displaced by the first membrane is compensated by the volume of fluid displaced by the second membrane. In this operating mode, none of the two membranes deforms, the first membrane translating relative to its rest position whereas the second membrane pivots relative to its rest position.

To produce the operating modes described hereinabove, enabling on the one hand deviation and on the other hand variation in focal length, optionally combined, the first membrane must exhibit sufficiently minimal stiffness for the reasons disclosed hereinbelow.

Figure 2A:
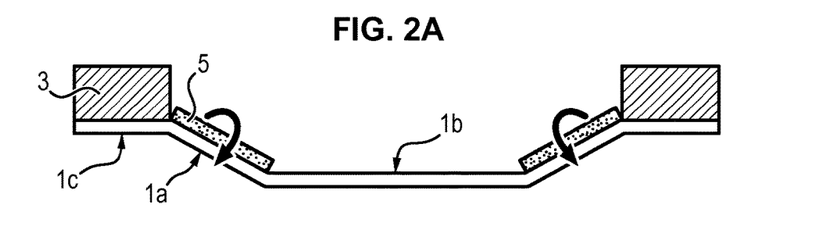
FIG. 2A illustrates deformation when empty (that is not subject to fluid pressure) of the first membrane of an optical device according to the invention.
Figure 2B:
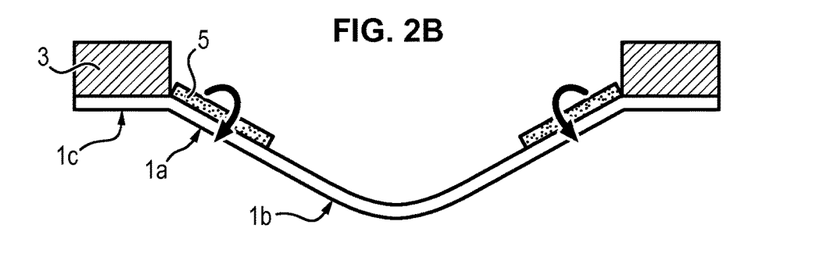
FIG. 2B illustrates by way of comparison deformation when empty of a membrane not suitable for executing the invention due to excessive stiffness.

FIGS. 2A and 2B present two examples of membranes having different degrees of stiffness, shown here anchored to a support but not subject to fluid pressure. It is supposed in both these cases that the membrane is planar at rest.

FIG. 2A shows a membrane having sufficiently minimal stiffness for executing the invention. This membrane 1 deforms only in the intermediate area 1a where the actuation device is located, but its central part 1b remains planar, simply by translating relative to its rest position.

FIG. 2B however illustrates a membrane 1 having excessive stiffness for execution of the invention, which manifests by the fact that when the actuation device 5 of said membrane is activated, the central part 1b of the membrane 1 deforms in the extension of the intermediate area 1a on which the actuation device 5 is arranged.

In the presence of the fluid 4, a membrane 1 having a sufficiently low stiffness such that that of FIG. 2A is capable of shifting without deforming on condition that the second membrane ensures compensation of the volume of fluid displaced by the actuation device of the first membrane and/or that said first membrane is activated so as to itself compensate the volume of fluid displaced (first embodiment). Also, the fact that the stiffness of the first membrane is sufficiently low allows the central part of said membrane to deform when the volume displaced by the actuation device of said membrane is not compensated by the second membrane or by the first membrane (second operating mode).

On the contrary, a membrane having excessive stiffness would be likely to deform despite the compensation of the volume of displaced fluid ensured by the second membrane in the first operating mode and producing deviation only.

To ensure that the membrane 1 has sufficiently low stiffness, those skilled in the art can use finite element modelling software (Comsol for example) to determine reference deformation of the membrane (without fluid pressure) under the effect of actuation (FIG. 2A).

For studying the behavior of membranes 1 and 2 under the effect of fluid pressure and adjusting their stiffness to obtain the preferred deformations, those skilled in the art can use a circular membrane deformation model such as that described in [1].

The relation between pressure p of fluid applied uniformly to the membrane and different parameters representative of the membrane is given by the formula:

$$p = 4 \frac{h}{R^2} \omega \left( \sigma_r + \frac{2.83}{4} \frac{E}{(1-v^2)} \frac{\omega^2}{R^2} \right) \quad (1)$$

where: p=4
h is the thickness of the membrane,
R is the radius of the membrane subject to the pressure p,
$\sigma_r$ is the residual stress in the membrane,
ω is the deflection at the center of the membrane,
v is the Poisson coefficient of the material constituting the membrane,
E is the Young's modulus of the material constituting the membrane.

For each of the two membranes the material, the geometry and the residual stress in the membrane can be adjusted to obtain stiffness and deformation in accordance with the expectations described hereinabove.

In an operating mode where a membrane is activated, the radius of said membrane is assimilated to the radius of the central part without taking into account the width of the actuation region.

At rest or in an embodiment where a membrane is not activated, the radius of said membrane is assimilated to the radius of the central part and the actuation region, if the supposition is made where the stiffness of the actuation device is of the same order of magnitude as the stiffness of the membrane.

Using index 1 for a membrane and index 2 for the other gives the equation hereinbelow, in which deflections $\omega_1$ and $\omega_2$ are the two unknowns:

$$4\frac{h_1}{R_1^2}\omega_1\left(\sigma_{r_1} + \frac{2.83}{4}\frac{E_1}{(1-\nu_1^2)}\frac{\omega_1^2}{R_1^2}\right) = 4\frac{h_2}{R_2^2}\omega_2\left(\sigma_{r_2} + \frac{2.83}{4}\frac{E_2}{(1-\nu_2^2)}\frac{\omega_2^2}{R_2^2}\right) \quad (2)$$

For a volume of fluid driven to the center of the device, the volumes are shared between the two membranes.

The volume driven to the center of the device is calculated by making the difference between the volumes displaced by each of the membranes, supposing that the central part of each membrane remains planar.

For a membrane subject to fluid pressure, the volume of fluid under the curved central part is calculated according to the equation hereinbelow:

$$V = \frac{\pi}{24}\omega(12R^2 + 4\omega^2) \quad (3)$$

By conserving the volume a second equation with two unknown results:

$$\frac{\pi}{24}\omega_1(12R_1^2 + 4\omega_1^2) = \frac{\pi}{24}\omega_2(12R_2^2 + 4\omega_2^2) \quad (4)$$

Resolution of equations (2) and (4) determines the unknowns $\omega_1$ and $\omega_2$.

Adjusting the characteristics of each membrane and including them in the equations described hereinabove can adjust the deformation and curvature of each membrane.

Optionally, the optical device can comprise a substrate having an optical function (for example diaphragm, infrared filter, etc.) between both membranes. The substrate delimits two fluid cavities. To retain the mechanical coupling exerted by the fluid on both membranes, it is ensured that the substrate enables passage of fluid from one cavity to the other so as to obtain equal fluid pressure in both cavities. For this purpose, one or more openings of adequate dimensions is provided in the substrate.

The optical device can be made using microelectronics techniques well known to those skilled in the art, especially techniques for thinn-layer depositing of chemical deposit type in vapor phase, physical deposit in vapor phase, electrodeposition, epitaxy, thermal oxidation, evaporation, film lamination. Also, anchoring the membranes on the support may involve adhesion techniques.

The membranes 1, 2 can be made based on organic materials such as polydimethylsiloxane, polymethyl methacrylate, polyethylene terephthalate, polycarbonate, parylene, epoxy resins, photosensitive polymers, silicones, or mineral materials such as silicon, silicon oxide, silicon nitride, polycrystalline silicon, diamond carbon. Membranes can comprise a single layer of the same material or a stack of layers of different materials.

Also, the membranes can have stiffness identical at every point of their surface, or by contrast have a different degree of stiffness in different regions. In this case, it is the central part which must respect the stiffness conditions disclosed earlier.

The fluid 4 can be a liquid such as propylene carbonate, water, an index liquid, a optic oil or an ionic liquid, a silicone oil, an inert liquid with high thermal stability and low saturating vapor pressure.

The fluid can optionally be a gas such as air, nitrogen or helium mainly for an optical device operating in reflection.

If the optical device functions in transmission, those skilled in the art will select the refraction index of the fluid as a function of the preferred optical performances.

According to an advantageous embodiment of the invention, the optical device can incorporate compensation means of variation in the focal distance due to variation in the temperature to which the device is subjected. In fact, a difference in thermal dilation coefficient between the different components can lead to modification in the focal distance of the optical device when the temperature varies by a significant amount.

Such compensation means are described in detail in document WO 2011/032925.

Exemplary Embodiment of an Optical Device

The device 100 can be made for example according to the following method.

Two sub-assemblies each formed from a silicon substrate and a membrane are produced first. In this respect reference could be made to document FR 2 962 557 which describes a manufacturing method of such a sub-assembly.

The material of each membrane is advantageously polymer (such as siloxane resin) or a mineral material (such as silicon oxide, polycrystalline silicon, silicon nitride).

Making each membrane involves controlling the residual stress in the membrane such that it is not excessively compressive (to avoid any bucking of the membrane) or excessively tensile (to avoid compromising its deformation as a function). Advantageously, the residual stress in each membrane is slightly tensile.

The actuation device of the first membrane is advantageously a piezoelectric device, preferably based on PZT.

Next, both sub-assemblies are assembled by encapsulating fluid.

This technique is conventionally used in making LCD screens and therefore will not be described in detail here.

Advantageously, an adhesive is used to assemble both substrates and ensure the distance separating them.

The fluid, for example an index liquid or optical oil, is previously dispensed on one of the substrates.

Finally, both membranes are successively released by etching the silicon substrates in the central part and the actuation area.

An optical device such as described hereinabove can advantageously be incorporated into an imaging device to fulfil the function of stabilization of images.

Figure 10:
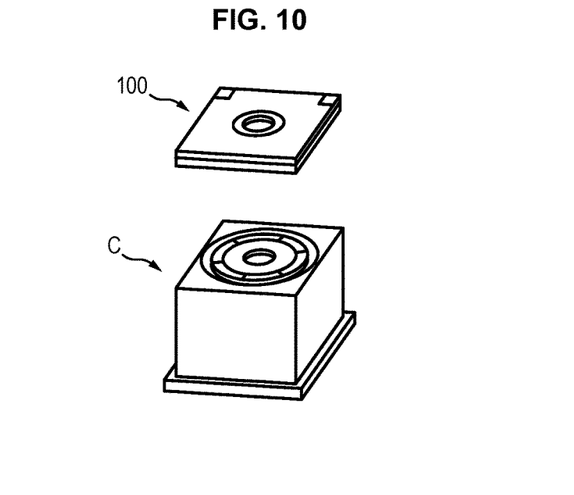
FIG. 10 is a main diagram of an imaging device comprising an optical device for stabilization of images according to the invention.

Purely by way of illustration, FIG. 10 shows an imaging device comprising a conventional camera C with fixed focal length and an optical device 100 according to the invention, for example arranged in front of said camera.

There are many other possible configurations of such imaging devices and the invention is not limited to the latter.

REFERENCES

JP 11-1332110
WO 2011/032925
WO 2011/032927
[1] The design, Fabrication and Testing of Corrugated Silicon Nitride Diaphragms, Journal of Microelectromechanical Systems, Vol. 3, No. 1, March 1994

The invention claimed is:
1. An optical device, comprising:
a first deformable membrane;

a second deformable membrane;

a support to which a respective peripheral anchoring area of each of the first deformable membrane and the second deformable membrane is connected;

fluid enclosed between the first deformable membrane and the second deformable membrane;

a first actuation device and a second actuation device, each comprising:

a respective first actuator arranged in a first part of an actuation region of a respective one of the first deformable membrane or the second deformable membrane, wherein the actuation region is located between the respective peripheral anchoring area and a respective central part of the respective deformable membrane;

a respective second actuator arranged in a second part of the actuation region of the respective deformable membrane, wherein the second part is diametrically opposed to the first part;

wherein at least one of the first actuation device or the second actuation device is configured to deform, via at least one of the respective first actuator or the respective second actuator, the respective deformable membrane such that the respective central part of the respective deformable membrane is shaped to deviate a path of light incident on the central part to stabilize an image.

2. The optical device of claim 1, wherein the first deformable membrane has sufficiently low stiffness so that, in the absence of fluid pressure, activation of the first actuation device sets the central part of the first deformable membrane in motion without deforming the first deformable membrane.

3. The optical device of claim 1, wherein each actuator of the first actuation device is configured to bend in a single direction.

4. The optical device of claim 3, wherein at least one actuator of the first actuation device comprises a piezoelectric crown.

5. The optical device of claim 3, wherein the second actuation device comprises a first actuator configured to bend in a first direction and a second actuator configured to bend in a second direction opposite the first direction.

6. The optical device of claim 5, wherein the second actuation device comprises actuators formed as beams.

7. The optical device of claim 1, wherein a diameter of the central part of the second deformable membrane is less than a diameter of the central part of the first deformable membrane, or a width of the actuation region of the second deformable membrane is greater than a width of the actuation region of the first deformable membrane.

8. The optical device of claim 1, wherein the first actuation device comprises a first actuator configured to bend in a first direction and a second actuator configured to bend in a second direction opposite the first direction.

9. The optical device of claim 1, wherein the optical device is configured for inclusion in an imaging device.

10. A method for deviation of an optical device having a first actuation device to deform a first deformable membrane and a second actuation device to deform a second deformable membrane, wherein the first actuation device comprises a first actuator and a second actuator, the method comprising:

activating the first actuator or the second actuator of the first actuation device to deform the first deformable membrane to deviate a path of light through the first deformable membrane to stabilize an image being captured from the light; and activating the second actuation device to deform a second deformable membrane through which the light passes.

11. The method of claim 10, wherein the activating the first actuator or the second actuator of the first actuation device comprises bending at least one of the first actuator or the second actuator in a single direction.

12. The method of claim 11, wherein when activating the first actuator or the second actuator of the first actuation device, at least one actuator of the second actuation device is either not activated or is activated to bend in a direction opposite the direction of bending of the at least one of the first actuator or the second actuator of the first actuation device.

13. The method of claim 10, wherein the activating the first actuator or the second actuator of the first actuation device comprises bending the first actuator in a first direction and bending the second actuator in a second direction opposite the first direction.

14. The method of claim 10, wherein the activating the second actuation device comprises activating at least one actuator of the second actuation device to shape the second deformable membrane to deviate the path of the light to stabilize the image being captured from the light.

15. An image-capture system, comprising:
a camera comprising:
an optical device comprising first and second deformable membranes; and
fluid enclosed between the first and second deformable membranes; and
first and second actuation devices each comprising respective first and second actuators configured to deform a respective central part of the respective deformable membranes to deviate a path of light incident on the central part to stabilize an image captured by the camera.

16. The image-capture system of claim 15, wherein the first deformable membrane of the optical device has sufficiently low stiffness so that, in the absence of fluid pressure, activation of the first actuation device sets the central part of the first deformable membrane in motion without deforming the first deformable membrane.

17. The image-capture system of claim 15, wherein each actuator of the first actuation device is configured to bend in a single direction.

18. The image-capture system of claim 15, wherein at least one actuator of the first actuation device comprises a piezoelectric crown.

19. The image-capture system of claim 15, wherein the second actuation device comprises a first actuator configured to bend in a first direction and a second actuator configured to bend in a second direction opposite the first direction.

20. The image-capture system of claim 15, wherein the second actuation device comprises actuators formed as beams.

* * * * *